United States Patent
Liu et al.

(10) Patent No.: US 10,057,165 B2
(45) Date of Patent: Aug. 21, 2018

(54) PACKET FORWARDING METHOD AND DEVICE

(71) Applicant: Huawei Technologies Co., Ltd., Shenzhen (CN)

(72) Inventors: Enhui Liu, Beijing (CN); Delei Yu, Beijing (CN); Chengyong Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 227 days.

(21) Appl. No.: 15/004,400

(22) Filed: Jan. 22, 2016

(65) Prior Publication Data

US 2016/0142312 A1 May 19, 2016

Related U.S. Application Data

(63) Continuation of application No. PCT/CN2013/079916, filed on Jul. 23, 2013.

(51) Int. Cl.
| | |
|---|---|
| *H04L 1/00* | (2006.01) |
| *H04L 12/741* | (2013.01) |
| *H04L 12/64* | (2006.01) |
| *H04L 12/24* | (2006.01) |
| *H04L 12/721* | (2013.01) |

(52) U.S. Cl.
CPC ........ *H04L 45/745* (2013.01); *H04L 12/6418* (2013.01); *H04L 41/5054* (2013.01); *H04L 45/34* (2013.01)

(58) Field of Classification Search
CPC ......... H04L 47/70; H04L 47/72; H04L 47/74; H04L 47/78; H04L 47/80; H04L 47/10;
(Continued)

(56) References Cited

U.S. PATENT DOCUMENTS

| | | | |
|---|---|---|---|
| 7,315,541 B1 * | 1/2008 | Housel | H04L 29/12481 370/392 |
| 2010/0211668 A1 | 8/2010 | Dolganow et al. | |
| 2012/0263186 A1 | 10/2012 | Ueno | |
| 2013/0160122 A1 | 6/2013 | Choi et al. | |

FOREIGN PATENT DOCUMENTS

| | | |
|---|---|---|
| CN | 101090377 A | 12/2007 |
| CN | 101127691 A | 2/2008 |

(Continued)

OTHER PUBLICATIONS

Chanda et al., "ContentFlow: Mapping Content to Flows in Software Defined Networks," Feb. 7, 2013, 10 pages, Santa Cruz, CA.

(Continued)

*Primary Examiner* — Dady Chery
(74) *Attorney, Agent, or Firm* — Slater Matsil, LLP

(57) ABSTRACT

Embodiments disclose a packet forwarding method and device. The method includes: obtaining, by a packet forwarding device, a feature character included in a packet to be forwarded. The feature character is obtained by parsing, according to a preset packet content parsing policy, other content included in the packet to be forwarded except a 5-tuple. The method includes determining, according to a correspondence between different feature characters and corresponding routing information, routing information corresponding to the obtained feature character, and sending, according to the determined routing information, the packet to be forwarded.

18 Claims, 8 Drawing Sheets

(58) Field of Classification Search
CPC ............. H04W 28/02; H04W 28/0205; H04W 28/021; H04W 28/0247; H04W 28/0252; H04W 28/0257; H04W 28/0263; H04W 28/0268; H04W 28/0273
USPC ......... 370/389–401, 351.498, 252, 238, 338, 370/469, 352, 230, 235, 369, 258, 402, 370/236; 709/245, 217–224, 230, 105, 709/206, 227–229, 238, 244; 379/220.01, 379/114.02, 221
See application file for complete search history.

(56) References Cited

FOREIGN PATENT DOCUMENTS

| | | |
|---|---|---|
| CN | 101388848 A | 3/2009 |
| CN | 101674221 A | 3/2010 |
| CN | 101834783 A | 9/2010 |
| CN | 102958029 A | 3/2013 |

OTHER PUBLICATIONS

Anonymous: "Tuple", Wikipedia, the free encyclopedia, xP055374403, Retrieved from the Internet: https://en.wikipedia.org/w/index.php?title=Tuple&oldid=564000994[retrieved on May 19, 2017].
"OpenFlow Switch Specification," Version 1.3.1 (Wire Protocol 0x04) Open Networking Foundation, ONF TS-007, Sep. 6, 2012 (Sep. 6, 2012), pp. 1-128.

* cited by examiner

PACKET FORWARDING METHOD AND DEVICE

This application is a continuation of International Application No. PCT/CN2013/079916, filed on Jul. 23, 2013, which is incorporated by reference in its entirety

TECHNICAL FIELD

The present invention relates to the field of communications technologies, and in particular, to a packet forwarding method and device.

BACKGROUND

An action of routing and forwarding includes two types of fundamental content: routing and forwarding. Routing means determining an optimal path for a packet to reach a destination. Forwarding means transmitting the packet along the determined optimal path to reach the destination. In order to implement the two types of fundamental content in turn, a router collects corresponding routing information according to a certain route selection algorithm to fill in a routing table in advance. Based on the routing table in which the routing information is filled, when performing routing, the router may determine, by searching the routing table, whether an entry used to instruct how to send a packet to a next site (where the site may be a router or a host) exists in the routing table. The router normally discards the packet if the entry is not found. Otherwise, the router forwards the packet to the next site according to the corresponding entry in the routing table, so as to implement packet forwarding.

In the prior art, a minimum granularity for the router to forward a packet is a 5-tuple flow. That is, a packet including 5-tuple (where "five elements" in the 5-tuple are: a destination IP address, a destination port, a source IP address, a source port, and a protocol, separately) is used as a minimum forwarding unit, and the packet is forwarded according to a forwarding principle of "forwarding, according to a same path, packets including a same 5-tuple".

Generally, in an application environment, such as a mobile network, especially in an application environment in which the HyperText Transfer Protocol (http), for example, http1.1, is commonly used, different http requests may also include a same 5-tuple. According to the foregoing forwarding principle used in the prior art, these different http requests including a same 5-tuple are eventually forwarded according to the same path.

At present, how to implement separate forwarding, according to different paths, of different http requests including a same 5-tuple has not been proposed in the prior art.

SUMMARY

Embodiments provide a packet forwarding method and device, thereby solving a problem in the prior art that different http requests including a same 5-tuple cannot be separately forwarded according to different paths. The embodiments further provide an information sending device. The embodiments use the following technical solutions.

According to a first aspect, a packet forwarding method is provided. The method includes: obtaining, by a packet forwarding device, a feature character included in a packet to be forwarded, where the feature character is obtained by parsing, according to a preset packet content parsing policy, other content included in the packet to be forwarded except a 5-tuple. The method also includes determining, according to a correspondence between different feature characters and corresponding routing information, routing information corresponding to the obtained feature character; and sending, according to the determined routing information, the packet to be forwarded.

With reference to the first aspect, in a first possible implementation manner, the obtaining, by a packet forwarding device, a feature character included in a packet to be forwarded specifically includes: sending, by the packet forwarding device to a controller, the packet to be forwarded, and obtaining a 5-tuple flow table delivered by the controller after the controller performs deep packet inspection (DPI) on the packet to be forwarded, where the 5-tuple flow table includes at least a correspondence between the 5-tuple included in the packet to be forwarded and a processing manner of the packet to be forwarded; determining, according to the 5-tuple included in the packet to be forwarded and the 5-tuple flow table, whether the processing manner of the packet to be forwarded is that the packet to be forwarded needs to be forwarded according to the feature character included in the packet to be forwarded. When a determination result is that the packet to be forwarded needs to be forwarded according to the feature character comprised in the packet to be forwarded, the obtaining also includes obtaining, by performing DPI on the packet to be forwarded, the feature character included in the packet to be forwarded.

With reference to the first possible implementation manner of the first aspect, in a second possible implementation manner, the sending, by the packet forwarding device to a controller, the packet to be forwarded specifically includes: determining, by the packet forwarding device, whether the packet to be forwarded is a packet of a user-specified protocol; and when determining that the packet to be forwarded is the packet of the user-specified protocol, sending, to the controller, the packet to be forwarded.

With reference to the first possible implementation manner of the first aspect, in a third possible implementation manner, the sending, by the packet forwarding device to a controller, the packet to be forwarded specifically includes: sending, by the packet forwarding device to the controller after determining, according to a user policy table delivered by a policy and charging rules function PCRF unit, that a user that sends the packet to be forwarded has enabled a service of forwarding a packet according to a feature character, the packet to be forwarded, where the user policy table includes a correspondence between different user identifiers and corresponding subscription states of the service.

With reference to the third possible implementation manner of the first aspect, in a fourth possible implementation manner, the sending, by the packet forwarding device to the controller after determining that a user that sends the packet to be forwarded has enabled a service of forwarding a packet according to a feature character, the packet to be forwarded specifically includes: after determining that the user that sends the packet to be forwarded has enabled the service of forwarding a packet according to a feature character, determining, by the packet forwarding device, whether the packet to be forwarded is a packet of a user-specified protocol; and when determining that the packet to be forwarded is the packet of the user-specified protocol, sending, to the controller, the packet to be forwarded.

With reference to the first aspect, in a fifth possible implementation manner, the obtaining, by a packet forwarding device, a feature character included in a packet to be forwarded specifically includes: obtaining, by the packet forwarding device by performing DPI on the packet to be forwarded, the feature character included in the packet to be forwarded.

With reference to the fifth possible implementation manner of the first aspect, in a sixth possible implementation manner, the obtaining, by the packet forwarding device by performing DPI on the packet to be forwarded, the feature character included in the packet to be forwarded, specifically includes: after receiving the packet to be forwarded, determining, by the packet forwarding device according to the 5-tuple included in the packet to be forwarded and a 5-tuple flow table delivered by a controller, whether the feature character included in the packet to be forwarded needs to be determined, where the 5-tuple flow table includes a correspondence between a 5-tuple and a packet processing manner. When a determination result is that the feature character included in the packet to be forwarded needs to be determined, the obtaining further includes obtaining, by performing DPI on the packet to be forwarded, the feature character included in the packet to be forwarded.

With reference to the fifth possible implementation manner of the first aspect, in a seventh possible implementation manner, the obtaining, by the packet forwarding device by performing DPI on the packet to be forwarded, the feature character included in the packet to be forwarded specifically includes: determining, by the packet forwarding device, whether the packet to be forwarded is a packet of a user-specified protocol; and when determining that the packet to be forwarded is the packet of the user-specified protocol, obtaining, by performing DPI on the packet to be forwarded, the feature character included in the packet to be forwarded.

With reference to the fifth possible implementation manner of the first aspect, in an eighth possible implementation manner, the obtaining, by the packet forwarding device by performing DPI on the packet to be forwarded, the feature character included in the packet to be forwarded specifically includes: after determining, according to a user policy table delivered by a policy and charging rules function PCRF unit, that a user that sends the packet to be forwarded has enabled a service of forwarding a packet according to a feature character, obtaining, by the packet forwarding device by performing DPI on the packet to be forwarded, the feature character included in the packet to be forwarded, where the user policy table includes a correspondence between different user identifiers and corresponding subscription states of the service.

With reference to the eighth possible implementation manner of the first aspect, in a ninth possible implementation manner, the obtaining, after determining that a user that sends the packet to be forwarded has enabled a service of forwarding a packet according to a feature character, and by the packet forwarding device by performing DPI on the packet to be forwarded, the feature character included in the packet to be forwarded specifically includes: after determining that the user that sends the packet to be forwarded has enabled the service of forwarding a packet according to a feature character, determining, by the packet forwarding device, whether the packet to be forwarded is a packet of a user-specified protocol; and when determining that the packet to be forwarded is the packet of the user-specified protocol, obtaining, by performing DPI on the packet to be forwarded, the feature character included in the packet to be forwarded.

With reference to the first aspect, or any one implementation manner of the first possible implementation manner to the ninth possible implementation manner of the first aspect, in a tenth possible implementation manner, the determining, by the packet forwarding device according to the correspondence between the different feature characters and the corresponding routing information, the routing information corresponding to the obtained feature character specifically includes: determining, by the packet forwarding device according to the correspondence in a flexible packet matching FPM table that is downloaded in advance, the routing information corresponding to the obtained feature character.

With reference to the first aspect, or any one implementation manner of the first possible implementation manner to the tenth possible implementation manner of the first aspect, in an eleventh possible implementation manner, the feature character included in the packet to be forwarded specifically includes: a feature character located at a specific position of the packet to be forwarded.

According to a second aspect, a packet forwarding method is provided. The method includes: receiving, by a packet forwarding device, a packet to be forwarded; sending, to a DPI server, the packet to be forwarded, so as to instruct the DPI server to perform: determining, according to a correspondence between different feature characters and corresponding routing information, routing information corresponding to a feature character included in the packet to be forwarded, and sending, according to the determined routing information, the packet to be forwarded. The feature character included in the packet to be forwarded is obtained by parsing, according to a preset packet content parsing policy, other content included in the packet to be forwarded except a 5-tuple.

With reference to the second aspect, in a first possible implementation manner, the sending, by a packet forwarding device to a DPI server, a packet to be forwarded specifically includes: sending, by the packet forwarding device to a controller, the packet to be forwarded, and obtaining a 5-tuple flow table delivered by the controller after the controller performs deep packet inspection (DPI) on the packet to be forwarded. The 5-tuple flow table includes at least a correspondence between the 5-tuple included in the packet to be forwarded and a processing manner of the packet to be forwarded. The sending also includes determining, by the packet forwarding device according to the 5-tuple included in the packet to be forwarded and the 5-tuple flow table, whether the processing manner of the packet to be forwarded is that the packet to be forwarded needs to be forwarded according to the feature character included in the packet to be forwarded; and when a determination result is that the processing manner of the packet to be forwarded is that the packet to be forwarded needs to be forwarded, sending, to the DPI server, the packet to be forwarded.

According to a third aspect, a packet forwarding method is provided. The method includes: obtaining, by a controller, a correspondence between different feature characters and corresponding routing information; and sending, to a packet forwarding device, information that is used to represent the correspondence, so as to instruct the packet forwarding device to perform: determining, according to the correspondence, routing information corresponding to a feature character included in a packet to be forwarded, and sending, according to the determined routing information, the packet to be forwarded; where the feature character is obtained by parsing, according to a preset packet content parsing policy, other content included in the packet to be forwarded except a 5-tuple.

With reference to the third aspect, in a first possible implementation manner, before the obtaining, by the controller, the correspondence, or before the sending, by the controller to the packet forwarding device, the information that is used to represent the correspondence, the method further includes: obtaining, by the controller, the packet to be forwarded that is sent by the packet forwarding device; determining, by the controller after obtaining the feature character by performing DPI on the packet to be forwarded, whether the feature character belongs to a preset feature character set, where a feature character included in the feature character set is a feature character included in a packet to be forwarded according to the correspondence; and sending, by the controller according to a determination result and the 5-tuple included in the packet to be forwarded, a 5-tuple flow table to the packet forwarding device, where the 5-tuple flow table includes at least a correspondence between the 5-tuple and a processing manner of the packet to be forwarded; when the determination result is that the feature character belongs to a preset feature character set, the processing manner of the packet to be forwarded is that the packet to be forwarded needs to be forwarded according to the feature character included in the packet to be forwarded; and when the determination result is that the feature character does not belong to a preset feature character set, the processing manner of the packet to be forwarded is that the packet to be forwarded does not need to be forwarded according to the feature character included in the packet to be forwarded.

With reference to the first possible implementation manner of the third aspect, in a second possible implementation manner, the sending, by the controller according to a determination result and the 5-tuple included in the packet to be forwarded, a 5-tuple flow table to the packet forwarding device specifically includes: determining, by the controller according to user information that is stored by a policy and charging rules function PCRF unit and used to represent whether a user has enabled a service of forwarding a packet according to a feature character, whether a user that sends the packet to be forwarded has enabled the service. When determining that the user has enabled the service, also included is sending the 5-tuple flow table to the packet forwarding device according to the determination result and the 5-tuple included in the packet to be forwarded.

With reference to the second possible implementation manner of the third aspect, in a third possible implementation manner, the determining, by the controller according to the user information, whether a user that sends the packet to be forwarded has enabled the service specifically includes: determining, by the controller, whether the packet to be forwarded is a packet of a user-specified protocol. When determining that the packet to be forwarded is the packet of the user-specified protocol, the determining includes determining, according to the user information, whether the user that sends the packet to be forwarded has enabled the service.

According to a fourth aspect, a packet forwarding device is provided. The device includes: a feature character obtaining unit, configured to obtain a feature character included in a packet to be forwarded, where the feature character is obtained by parsing, according to a preset packet content parsing policy, other content included in the packet to be forwarded except a 5-tuple. The device also includes a routing information determining unit, configured to determine, according to a correspondence between different feature characters and corresponding routing information, routing information corresponding to the feature character obtained by the feature character obtaining unit; and a packet sending unit, configured to send, according to the routing information determined by the routing information determining unit, the packet to be forwarded.

With reference to the fourth aspect, in a first possible implementation manner, the feature character obtaining unit specifically includes: a packet sending subunit, configured to send, to a controller, the packet to be forwarded; a flow table obtaining subunit, configured to obtain a 5-tuple flow table delivered by the controller after the controller performs deep packet inspection (DPI) on the packet to be forwarded that is sent by the packet sending subunit, where the 5-tuple flow table includes at least a correspondence between the 5-tuple included in the packet to be forwarded and a processing manner of the packet to be forwarded. Also included is a determining subunit, configured to determine, according to the 5-tuple included in the packet to be forwarded and the 5-tuple flow table obtained by the flow table obtaining subunit, whether the processing manner of the packet to be forwarded is that the packet to be forwarded needs to be forwarded according to the feature character included in the packet to be forwarded; and a feature character obtaining subunit, configured to: when a determination result obtained by the determining subunit is that the processing manner of the packet to be forwarded is that the packet to be forwarded needs to be forwarded, obtain, by performing DPI on the packet to be forwarded, the feature character included in the packet to be forwarded.

With reference to the first possible implementation manner of the fourth aspect, in a second possible implementation manner, the packet sending subunit is specifically configured to: determine whether the packet to be forwarded is a packet of a user-specified protocol; and when determining that the packet to be forwarded is the packet of the user-specified protocol, send, to the controller, the packet to be forwarded.

With reference to the first possible implementation manner of the fourth aspect, in a third possible implementation manner, the packet sending subunit is specifically configured to: after determining, according to a user policy table delivered by a policy and charging rules function PCRF unit, that a user that sends the packet to be forwarded has enabled a service of forwarding a packet according to a feature character, send, to the controller, the packet to be forwarded, where the user policy tab0le includes a correspondence between different user identifiers and corresponding subscription states of the service.

With reference to the third possible implementation manner of the fourth aspect, in a fourth possible implementation manner, the packet sending subunit is specifically configured to: after determining that the user that sends the packet to be forwarded has enabled the service of forwarding a packet according to a feature character, determine whether the packet to be forwarded is a packet of a user-specified protocol; and when determining that the packet to be forwarded is the packet of the user-specified protocol, send, to the controller, the packet to be forwarded.

With reference to the fourth aspect, in a fifth possible implementation manner, the feature character obtaining unit is specifically configured to: obtain, by performing DPI on the packet to be forwarded, the feature character included in the packet to be forwarded.

With reference to the fifth possible implementation manner of the fourth aspect, in a sixth possible implementation manner, the feature character obtaining unit is specifically configured to: after receiving the packet to be forwarded, determine, according to the 5-tuple included in the packet to be forwarded and a 5-tuple flow table delivered by a controller, whether the feature character included in the packet to be forwarded needs to be determined, where the 5-tuple flow table includes a correspondence between a 5-tuple and a packet processing manner; and when a determination result is that the feature character included in the packet to be forwarded needs to be determined, obtain, by performing DPI on the packet to be forwarded, the feature character included in the packet to be forwarded.

With reference to the fifth possible implementation manner of the fourth aspect, in a seventh possible implementation manner, the feature character obtaining unit is specifically configured to: determine whether the packet to be forwarded is a packet of a user-specified protocol; and when determining that the packet to be forwarded is the packet of the user-specified protocol, obtain, by performing DPI on the packet to be forwarded, the feature character included in the packet to be forwarded.

With reference to the fifth possible implementation manner of the fourth aspect, in an eighth possible implementation manner, the feature character obtaining unit is specifically configured to: after determining, according to a user policy table delivered by a policy and charging rules function PCRF unit, that a user that sends the packet to be forwarded has enabled a service of forwarding a packet according to a feature character, obtain, by performing DPI on the packet to be forwarded, the feature character included in the packet to be forwarded, where the user policy table includes a correspondence between different user identifiers and corresponding subscription states of the service.

With reference to the eighth possible implementation manner of the fourth aspect, in a ninth possible implementation manner, the feature character obtaining unit is specifically configured to: after determining that the user that sends the packet to be forwarded has enabled the service of forwarding a packet according to a feature character, determine whether the packet to be forwarded is a packet of a user-specified protocol; and when determining that the packet to be forwarded is the packet of the user-specified protocol, obtain, by performing DPI on the packet to be forwarded, the feature character included in the packet to be forwarded.

With reference to the fourth aspect, or any one implementation manner of the first to the ninth possible implementation manners of the fourth aspect, in a tenth possible implementation manner, the routing information determining unit is specifically configured to: determine, according to the correspondence in a flexible packet matching FPM table that is downloaded in advance, the routing information corresponding to the obtained feature character.

With reference to the fourth aspect, or any one implementation manner of the first to the tenth possible implementation manners of the fourth aspect, in an eleventh possible implementation manner, the feature character included in the packet to be forwarded specifically includes: a feature character located at a specific position of the packet to be forwarded.

According to a fifth aspect, a packet forwarding device is provided. The device includes: a packet receiving unit, configured to receive a packet to be forwarded; and a packet sending unit, configured to send the packet to be forwarded that is received by the packet receiving unit to a DPI server, so as to instruct the DPI server to perform: determining, according to a correspondence between different feature characters and corresponding routing information, routing information corresponding to a feature character included in the packet to be forwarded, and sending, according to the determined routing information, the packet to be forwarded, where the feature character included in the packet to be forwarded is obtained by parsing, according to a preset packet content parsing policy, other content included in the packet to be forwarded except a 5-tuple.

With reference to the fifth aspect, in a first possible implementation manner, the packet sending unit specifically includes: a packet sending subunit, configured to send, to a controller, the packet to be forwarded; a flow table obtaining subunit, configured to obtain a 5-tuple flow table delivered by the controller after the controller performs deep packet inspection (DPI) on the packet to be forwarded that is sent by the packet sending subunit, where the 5-tuple flow table includes at least a correspondence between the 5-tuple included in the packet to be forwarded and a processing manner of the packet to be forwarded. Also included is a determining subunit, configured to determine, according to the 5-tuple included in the packet to be forwarded and the 5-tuple flow table obtained by the flow table obtaining subunit, whether the processing manner of the packet to be forwarded is that the packet to be forwarded needs to be forwarded according to the feature character included in the packet to be forwarded; and the packet sending subunit, configured to: when a determination result obtained by the determining subunit is the processing manner of the packet to be forwarded is that the packet to be forwarded needs to be forwarded, send, to the DPI server, the packet to be forwarded.

According to a sixth aspect, an information sending device is provided. The device includes: a correspondence obtaining unit, configured to obtain a correspondence between different feature characters and corresponding routing information; and a correspondence sending unit, configured to send, to a packet forwarding device, information that is used to represent the correspondence obtained by the correspondence obtaining unit, so as to instruct the packet forwarding device to perform: determining, according to the correspondence, routing information corresponding to a feature character included in a packet to be forwarded, and sending, according to the determined routing information, the packet to be forwarded; where the feature character is obtained by parsing, according to a preset packet content parsing policy, other content included in the packet to be forwarded except a 5-tuple.

With reference to the sixth aspect, in a first possible implementation manner, the device further includes: a packet obtaining unit, configured to: before the correspondence obtaining unit obtains the correspondence, or before the correspondence sending unit sends, to the packet forwarding device, the information that is used to represent the correspondence, obtain the packet to be forwarded that is sent by the packet forwarding device. The device further includes a determining unit, configured to: after obtaining the feature character by performing DPI on the packet to be forwarded that is obtained by the packet obtaining unit, determine whether the feature character belongs to a preset feature character set, where a feature character included in the feature character set is a feature character included in a packet to be forwarded according to the correspondence. Also included is a flow table sending unit, configured to send a 5-tuple flow table to the packet forwarding device according to a determination result obtained by the determining unit and the 5-tuple included in the packet to be forwarded, where the 5-tuple flow table includes at least a correspondence between the 5-tuple and a processing manner of the packet to be forwarded. When the determination result is that the feature character belongs to a preset feature character set, the processing manner of the packet to be forwarded is that the packet to be forwarded needs to be forwarded according to the feature character included in the packet to be forwarded; and when the determination result is that the feature character does not belong to a preset feature character set, the processing manner of the packet to be forwarded is that the packet to be forwarded does not need to be forwarded according to the feature character included in the packet to be forwarded.

With reference to the first possible implementation manner of the sixth aspect, in a second possible implementation manner, the flow table sending unit is specifically configured to: determine, according to user information that is stored by a policy and charging rules function PCRF unit and used to represent whether a user has enabled a service of forwarding a packet according to a feature character, whether a user that sends the packet to be forwarded has enabled the service; and when determining that the user has enabled the service, send the 5-tuple flow table to the packet forwarding device according to the determination result and the 5-tuple included in the packet to be forwarded.

With reference to the second possible implementation manner of the sixth aspect, in a third possible implementation manner, the flow table sending unit is specifically configured to: determine whether the packet to be forwarded is a packet of a user-specified protocol; and when determining that the packet to be forwarded is the packet of the user-specified protocol, determine, according to the user information, whether the user that sends the packet to be forwarded has enabled the service.

According to the solutions provided in the embodiments, because a corresponding route is determined according to a feature character that is included in a packet and obtained by parsing other content except a 5-tuple, and the packet is forwarded according to the route, even for different packets including a same 5-tuple, the solution provided in the embodiments is capable of implementing forwarding of different packets to different routes. Therefore, a problem in the prior art that different http requests including a same 5-tuple cannot be separately forwarded according to different paths is solved.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In order to provide a solution for implementing separate forwarding of different http requests including a same 5-tuple, the inventor studied characteristics of the http requests. According to the study, it is found that an http request includes data of each protocol layer included in a system structure of an Open Systems Interconnection (OSI) 7-layer model and therefore, the http request may also be called a 7-layer packet. The system structure of the OSI 7-layer model includes seven protocol layers in total, which are an application layer, a presentation layer, a session layer, a transport layer, a network layer, a data link layer, and a physical layer from a top layer to a bottom layer in turn.

Generally, if multiple 7-layer packets include a same 5-tuple, a feature, that is, the 5-tuple, cannot present a difference between different 7-layer packets. However, the difference between the different 7-layer packets may be presented by using specific formats of the packets. For example, in two http1.1 requests that both include a same 5-tuple, if a feature of one http1.1 request is that, the http1.1 request has a feature character "xxx" (note: "xxx" herein makes a general reference to a certain feature character, but does not represent specific content of the feature character; the following "yyy" is similar) at a position of the nth byte away from a packet header, and a feature of the other http1.1 request is that, the other http1.1 request has a feature character "yyy" at a same position away from a packet header. Therefore, the two feature characters may be used as one of bases for differentiating the two http1.1 requests. Certainly, according to an http syntax or another manner, two different http1.1 requests may also be differentiated by using a key word at another position.

Similarly, different 7-layer packets that is of another protocol and include a same 5-tuple may also be differentiated in the foregoing manner. Generally, a deep service identification (DPI, Deep Packet Inspection) technology may be used to differentiate and identify a 7-layer packet.

Based on the foregoing study on the prior art, embodiments provide a solution for separately implementing, based on a feature that can present a difference between different 7-layer packets, routing and forwarding of the different 7-layer packets. The solution provided in the embodiments is described in detail as follows with reference to accompanying drawings.

Figure 1:
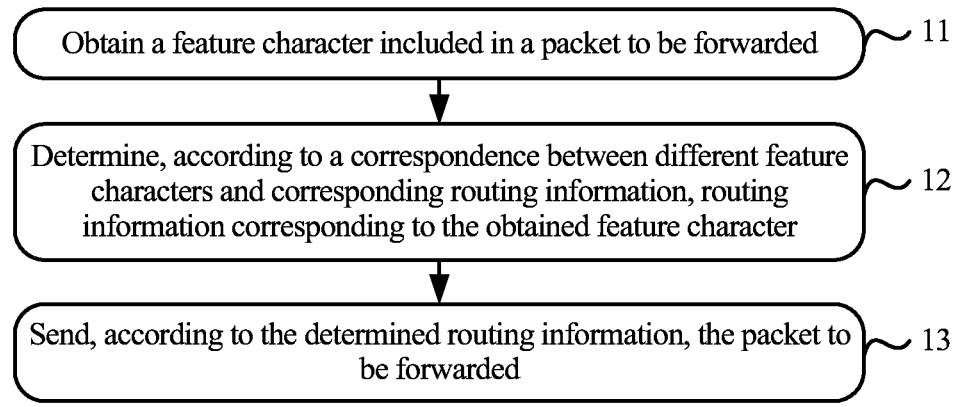
FIG. 1 is a flowchart of specific implementation of a first packet forwarding method according to an embodiment.

First, an embodiment provides a packet forwarding method. A schematic flowchart of specific implementation of the method is shown in FIG. 1, which includes the following steps.

11. A packet forwarding device obtains a feature character included in a packet to be forwarded.

The feature character may be obtained by parsing, according to a preset packet content parsing policy, other content included in the packet to be forwarded except a 5-tuple.

A specific position that needs to be parsed in the packet to be forwarded may be specified in the packet content parsing policy herein. For example, it is specified to parse a feature character at a position of the nth byte away from a packet header (or a packet tail) in the packet to be forwarded. Alternatively, the specific position may also not be specified for the packet content parsing policy, but merely parsing is regulated for all content of a packet, so as to obtain a specific feature character existing in the packet.

In this embodiment, a specific implementation manner of 11 may be that, the packet forwarding device itself performs DPI on the packet to be forwarded, so as to obtain the feature character included in the packet to be forwarded; or may also be that the packet forwarding device obtains, after sending, to a controller, the packet to be forwarded, the feature character included in the packet to be forwarded, where the feature character is obtained by performing DPI on the packet to be forwarded and sent by the Controller.

12. The packet forwarding device determines, according to a correspondence between different feature characters and corresponding routing information, routing information corresponding to the obtained feature character.

Generally, the correspondence may be set in advance.

The correspondence may be set in a router in advance. Alternatively, the correspondence may also be set in the controller, and be delivered by the Controller to the packet forwarding device according to a request of the packet forwarding device, or be downloaded by the packet forwarding device from the Controller, or be delivered proactively by the Controller to the packet forwarding device.

Optionally, the correspondence may be stored in a flexible packet matching (FPM) table. The FPM table may be set in the Controller or in the packet forwarding device in advance.

13. The packet forwarding device sends, according to the determined routing information, the packet to be forwarded.

According to the foregoing method provided in the embodiment, because in the method, a corresponding route is determined according to a feature character that is included in a packet and parsed from other content except a 5-tuple, and the packet is forwarded according to the route, even for different packets including a same 5-tuple, the solution provided in the embodiments is capable of implementing forwarding of different packets to different routes. Therefore, the method solves a problem in the prior art that different http requests including a same 5-tuple cannot be separately forwarded according to different paths. It should be noted that the solution provided in the embodiment is further applicable to forwarding of different packets of another protocol.

By making improvement on the method provided in the embodiment, a manner in which only a packet including a specific 5-tuple is forwarded according to a feature character may also be implemented. Specifically, the objective may be achieved by making improvement on the foregoing 11. For example, when the packet forwarding device itself performs DPI on the packet to be forwarded and obtains the feature character included in the packet to be forwarded, after receiving the packet to be forwarded, the packet forwarding device may first determine, according to the 5-tuple included in the packet to be forwarded and the 5-tuple flow table delivered by the Controller, whether the feature character included in the packet to be forwarded needs to be determined; then, when a determination result is yes, perform DPI on the packet to be forwarded to obtain the feature character included in the packet to be forwarded. The 5-tuple flow table includes a correspondence between a 5-tuple and a packet processing manner. In this embodiment of the present invention, the packet processing manner herein includes a manner such as "performing DPI on a packet to be forwarded to obtain a feature character included in the packet to be forwarded". Therefore, once it is determined, according to the 5-tuple flow table, that a packet including a 5-tuple needs to be processed according to the packet processing manner, DPI may be further performed on the packet to be forwarded, so as to obtain the feature character included in the packet to be forwarded.

Optionally, when the packet forwarding device itself performs DPI on the packet to be forwarded to obtain the feature character included in the packet to be forwarded, after receiving the packet to be forwarded, the packet forwarding device may first determine whether the packet to be forwarded is a packet of a user-specified protocol (for example, http); and when determining that the packet to be forwarded is the packet of the user-specified protocol, perform DPI on the packet to be forwarded to obtain the feature character included in the packet to be forwarded. By using this manner, it can be implemented that a manner of forwarding according to a feature character is used for forwarding only a packet of a user-specified protocol.

By making improvement on the method provided in the embodiment, a manner of forwarding a packet according to a feature character only for a part of users may also be implemented. Specifically, the objective may also be achieved by making improvement on the foregoing 11. When the packet forwarding device itself performs DPI on the packet to be forwarded to obtain the feature character included in the packet to be forwarded, the packet forwarding device may perform DPI on the packet to be forwarded to obtain the feature character included in the packet to be forwarded only after determining, according to a user policy table delivered by a policy and charging rules function PCRF unit, that a user that sends the packet to be forwarded has enabled a service of forwarding a packet according to a feature character. The user policy table described herein may include a correspondence between different user identifiers and corresponding subscription states of the "service of forwarding a packet according to a feature character".

Optionally, after it is determined that the user that sends the packet to be forwarded has enabled the service of forwarding a packet according to a feature character, it may be further determined whether the packet to be forwarded is a packet of a user-specified protocol (for example, http); and when it is determined that the packet to be forwarded is the packet of the user-specified protocol, DPI is performed on the packet to be forwarded to obtain the feature character included in the packet to be forwarded. By using this manner, it can be implemented that a manner of forwarding according to a feature character is used for forwarding only a packet of a user-specified protocol.

In this embodiment, a specific process in which the packet forwarding device obtains the feature character included in the packet to be forwarded may include the following steps. First, sending, by the packet forwarding device to the Controller, the packet to be forwarded, and obtaining the 5-tuple flow table delivered by the Controller after the Controller performs DPI on the packet to be forwarded, where the 5-tuple flow table includes at least a correspondence between the 5-tuple included in the packet to be forwarded and a processing manner of the packet to be forwarded. Next, determining, according to the 5-tuple included in the packet to be forwarded and the 5-tuple flow table, whether the processing manner of the packet to be forwarded is that the packet to be forwarded needs to be forwarded according to the feature character included in the packet to be forwarded. Eventually, when a determination result is that the processing manner of the packet to be forwarded is that the packet to be forwarded needs to be forwarded according to the feature character included in the packet to be forwarded, obtaining, by performing DPI on the packet to be forwarded, the feature character included in the packet to be forwarded.

Optionally, the packet forwarding device may first determine whether the packet to be forwarded is a packet of a user-specified protocol, and when determining that the packet to be forwarded is the packet of the user-specified protocol, send, to the Controller, the packet to be forwarded.

Alternatively, the packet forwarding device may, after determining, according to the user policy table delivered by the PCRF unit, that the user that sends the packet to be forwarded has enabled the service of forwarding a packet according to a feature character, send, to the Controller, the packet to be forwarded, where the user policy table may include a correspondence between different user identifiers and corresponding subscription states of the service of forwarding a packet according to a feature character.

Optionally, after determining that the user that sends the packet to be forwarded has enabled the service of forwarding a packet according to a feature character, the packet forwarding device may further determine whether the packet to be forwarded is a packet of a user-specified protocol; and when determining that the packet to be forwarded is the packet of the user-specified protocol, send, to the Controller, the packet to be forwarded.

Optionally, the correspondence between the feature character and the corresponding routing information in the foregoing improved manner may exist in an FPM table that is downloaded in advance.

Figure 2:
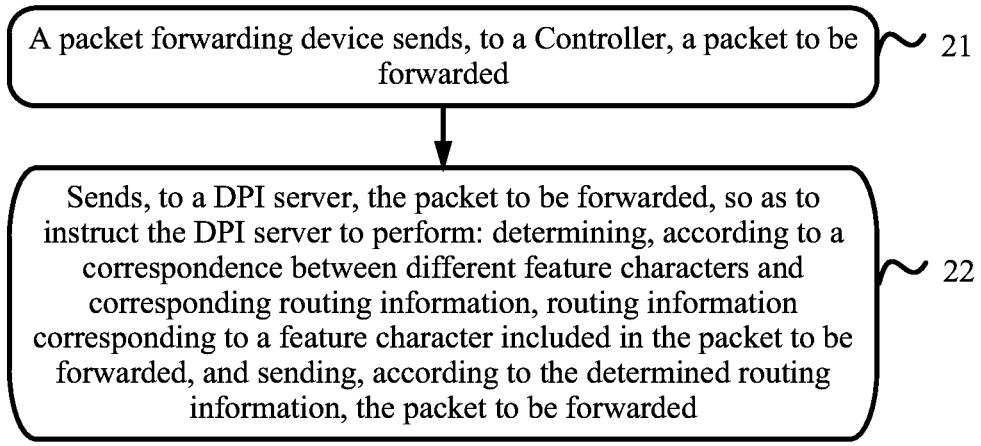
FIG. 2 is a flowchart of specific implementation of a second packet forwarding method according to an embodiment.

Based on the same invention idea as the method shown in FIG. 1 and provided in the embodiment, an embodiment further provides another packet forwarding method. A schematic flowchart of specific implementation of the method is shown in FIG. 2, which includes the following steps.

21. A packet forwarding device receives a packet to be forwarded.

22. Send, to a DPI server, the packet to be forwarded, so as to instruct the DPI server to perform: determining, according to a correspondence between different feature characters and corresponding routing information, routing information corresponding to a feature character included in the packet to be forwarded, and sending, according to the determined routing information, the packet to be forwarded.

The feature character included in the packet to be forwarded is obtained by parsing, according to a preset packet content parsing policy, other content included in the packet to be forwarded except a 5-tuple.

Optionally, in the foregoing 22, a specific implementation process in which the packet to be forwarded is sent to the DPI server may include the following steps. First, sending, by the packet forwarding device, to a Controller, the packet to be forwarded. Second, obtaining, by the packet forwarding device. a 5-tuple flow table delivered by the Controller after the Controller performs DPI on the packet to be forwarded, where the 5-tuple flow table includes at least a correspondence between the 5-tuple included in the packet to be forwarded and a processing manner of the packet to be forwarded. Eventually, determining, by the packet forwarding device, according to the 5-tuple included in the packet to be forwarded and the 5-tuple flow table, whether the processing manner of the packet to be forwarded is that the packet to be forwarded needs to be forwarded according to the feature character included in the packet to be forwarded; and when a determination result is yes, sending, to the DPI server, the packet to be forwarded.

Figure 3:
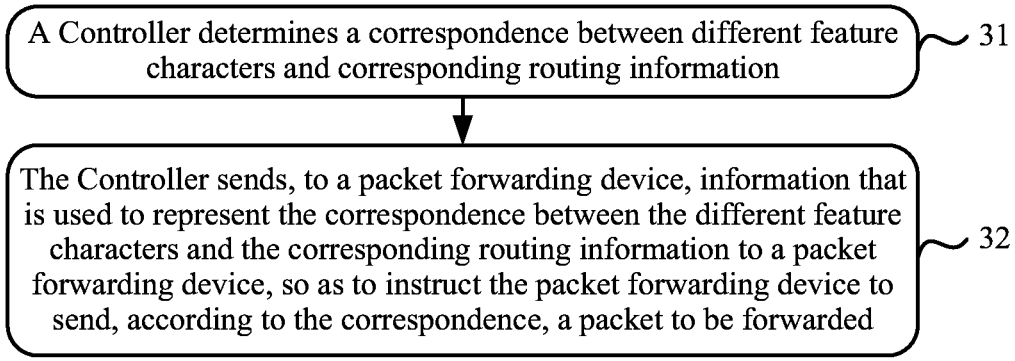
FIG. 3 is a flowchart of specific implementation of a third packet forwarding method according to an embodiment.

Based on the same invention idea as the method shown in FIG. 1 and provided in the embodiment, an embodiment further provides another packet forwarding method. A flowchart of specific implementation of the method is shown in FIG. 3, which includes the following steps.

31. A Controller obtains a correspondence between different feature characters and corresponding routing information.

32. The Controller sends, to a packet forwarding device, information that is used to represent the correspondence between the different feature characters and the corresponding routing information, so as to instruct the packet forwarding device to perform: determining, according to the correspondence, routing information corresponding to a feature character included in a packet to be forwarded, and sending, according to the determined routing information, the packet to be forwarded.

The feature character included in the packet to be forwarded is obtained by parsing, according to a preset packet content parsing policy, other content included in the packet to be forwarded except a 5-tuple.

Optionally, before the Controller obtains the correspondence, or before the Controller sends, to the packet forwarding device, the information that is used to represent the correspondence, the Controller may further perform the following operations. First, obtaining the packet to be forwarded that is sent by the packet forwarding device. Second, after obtaining the feature character by performing DPI on the packet to be forwarded, determining whether the feature character belongs to a preset feature character set, where a feature character included in the feature character set is a feature character included in a packet to be forwarded according to the correspondence. Eventually, the Controller sends, according to a determination result and the 5-tuple included in the packet to be forwarded, a 5-tuple flow table to the packet forwarding device, where the 5-tuple flow table includes at least a correspondence between the 5-tuple included in the packet to be forwarded and a processing manner of the packet to be forwarded; when the determination result is yes, the processing manner of the packet to be forwarded is that the packet to be forwarded needs to be forwarded according to the feature character included in the packet to be forwarded; and when the determination result is no, the processing manner of the packet to be forwarded is that the packet to be forwarded does not need to be forwarded according to the feature character included in the packet to be forwarded.

Optionally, a specific process in which the Controller sends, according to a determination result and the 5-tuple included in the packet to be forwarded, a 5-tuple flow table to the packet forwarding device may include the following steps. Determining, by the Controller according to user information that is stored by a policy and charging rules function (PCRF) unit and used to represent whether a user has enabled a service of forwarding a packet according to a feature character, whether a user that sends the packet to be forwarded has enabled the service. Eventually, when a determination result is that the user has enabled the service, sending, according to the determination result and the 5-tuple included in the packet to be forwarded, the 5-tuple flow table to the packet forwarding device.

Optionally, a process in which the Controller determines, according to the user information, whether the user that sends the packet to be forwarded has enabled the service specifically includes the following steps. First, determining, by the Controller, whether the packet to be forwarded in a packet of a user-specified protocol. Second, when determining that the packet to be forwarded is the packet of the user-specified protocol, determining, according to the user information, whether the user that sends the packet to be forwarded has enabled the service.

An actual application of the foregoing solutions provided in the embodiments is described in detail with reference to several specific embodiments as follows:

Embodiment 1

Embodiment 1 is an implementation manner based on "simple DPI".

DPI is an application layer-based traffic inspection and control technology. A fundamental principle of the technology is that: By deeply reading content of IP packet payload, reassembly of application layer information in an OSI 7-layer protocol is implemented, so as to obtain content of an entire application program, and a shape operation is performed on traffic according to a management policy defined by a system. Because this technology is relatively mature prior art and is not an invention point of the present invention, it is not describe in detail herein.

In Embodiment 1, the simple DPI is defined as parsing a feature character at a specific position of a 7-layer packet. In an example of two different http1.1 request packets, a feature character that is at the 100th byte away from a packet header of the two http1.1 request packets may be parsed separately, so that a feature character "xxx" may be parsed from a first http1.1 request packet, and a feature character "yyy" may be parsed from a same position of a second http1.1 request.

Figure 4:
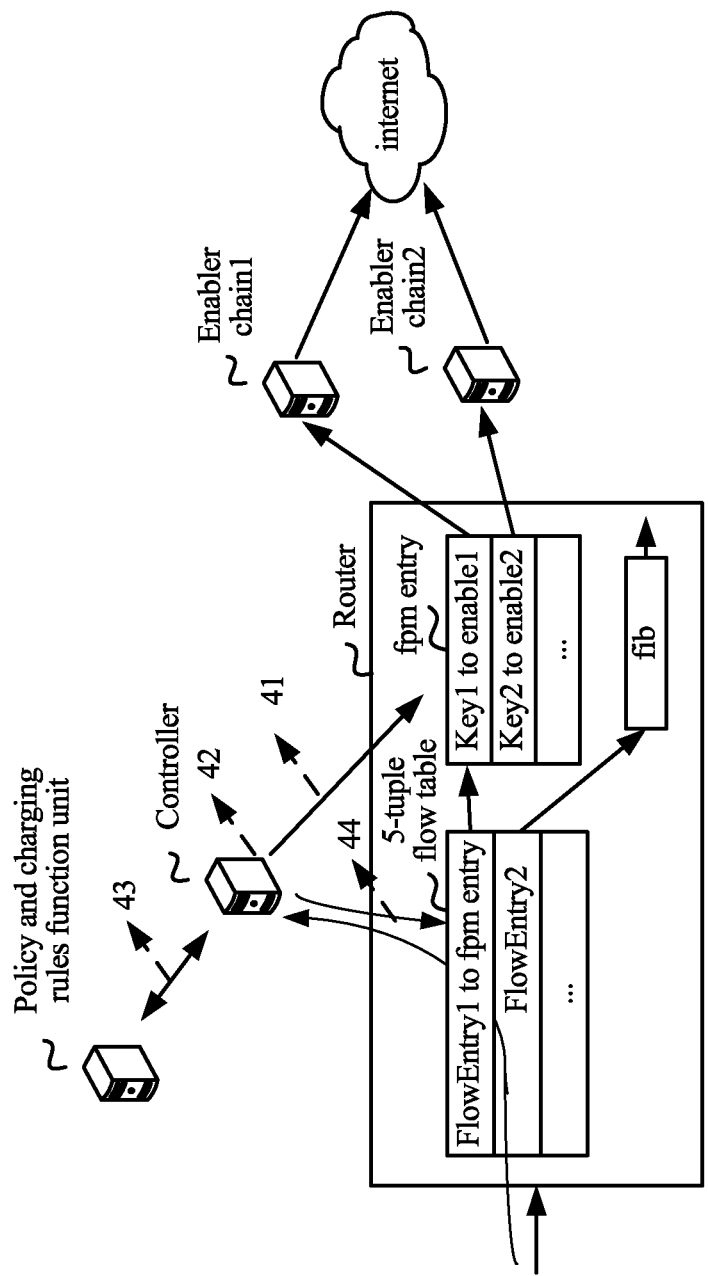
FIG. 4 is a schematic flowchart of specific implementation of Embodiment 1.

The following, with reference to FIG. 4, describes an implementation procedure of separately forwarding different http requests having a same 5-tuple in Embodiment 1, where numerals 41 to 44 in FIG. 4 represent the following serial numbers 41 to 44 in turn. Specifically, the procedure mainly includes:

41. A router delivers a correspondence between some request feature characters (Key) in an http1.1 request packet and corresponding routing information to an fpm table in advance.

As shown in FIG. 4, information representing a correspondence between different Keys and routing information is shown as, for example, "Key1 to enable1" and "Key2 to ebable2", where enable1 and enable2 are identifiers of different Enabler chains. Using "Key1 to enable1" as an example, a meaning thereof is that an http1.1 request packet including a feature character Key1 needs to be routed to an Enabler chain1 shown in FIG. 4. Similarly, using "Key2 to enable2" as an example, a meaning thereof is that an http1.1 request packet including a feature character Key2 needs to be routed to an Enabler chain2 shown in FIG. 4.

42. After the router mirrors a first packet (that is, a first request packet in a data flow to be forwarded that is received by the router) to a Controller, the Controller performs DPI on the request packet, so as to determine whether the request packet is an http1.1 packet.

43. The Controller requests user information from a PCRF unit if the controller determines that the request packet is an http1.1 packet, so as to determine whether a user that sends the request packet has enabled a service of forwarding a packet according to a feature character.

44. If the Controller determines that the user that sends the request packet has enabled the service of forwarding a packet according to a feature character, the Controller delivers a 5-tuple flow (Five-tuple) table to the router.

Information included in the 5-tuple flow table may be used to indicate the following to the router: 1. using content in a byte of a specific length that is obtained from a specified position of the packet as a key word (Key); and 2. a processing manner of an http1.1 request packet including a 5-tuple.

45. The router determines, according to the 5-tuple flow table delivered by the Controller, that a processing manner of the first packet is "forwarding according to a feature character", further obtains a Key in the first packet, and routes the first packet to a corresponding Enabler chain according to an fpm entry hit by the Key. Because specifics of an implementation manner of 45 depend on specific content of the http1.1 request packet, which is relatively flexible, 45 is not indicated in FIG. 4.

It should be noted that if the Router determines, according to the 5-tuple flow table delivered by the Controller, that the processing manner of the first packet is "forwarding not necessarily according to a feature character", the router may query a forward information base (FIB, Forward Information Base), so as to implement forwarding of the first packet according to a packet forwarding manner provided by the prior art. The FIB may include routing information and information, such as a 5-tuple, corresponding to the routing information. Based on the FIB, the router may find routing information corresponding to the 5-tuple included in the packet to be forwarded, and forward, according to the found routing information, the packet to be forwarded, so as to implement forwarding, according to the packet forwarding method in the prior art, of the packet to be forwarded.

Embodiment 2

Embodiment 2 is an implementation manner with reference to a "user policy table".

Figure 5:
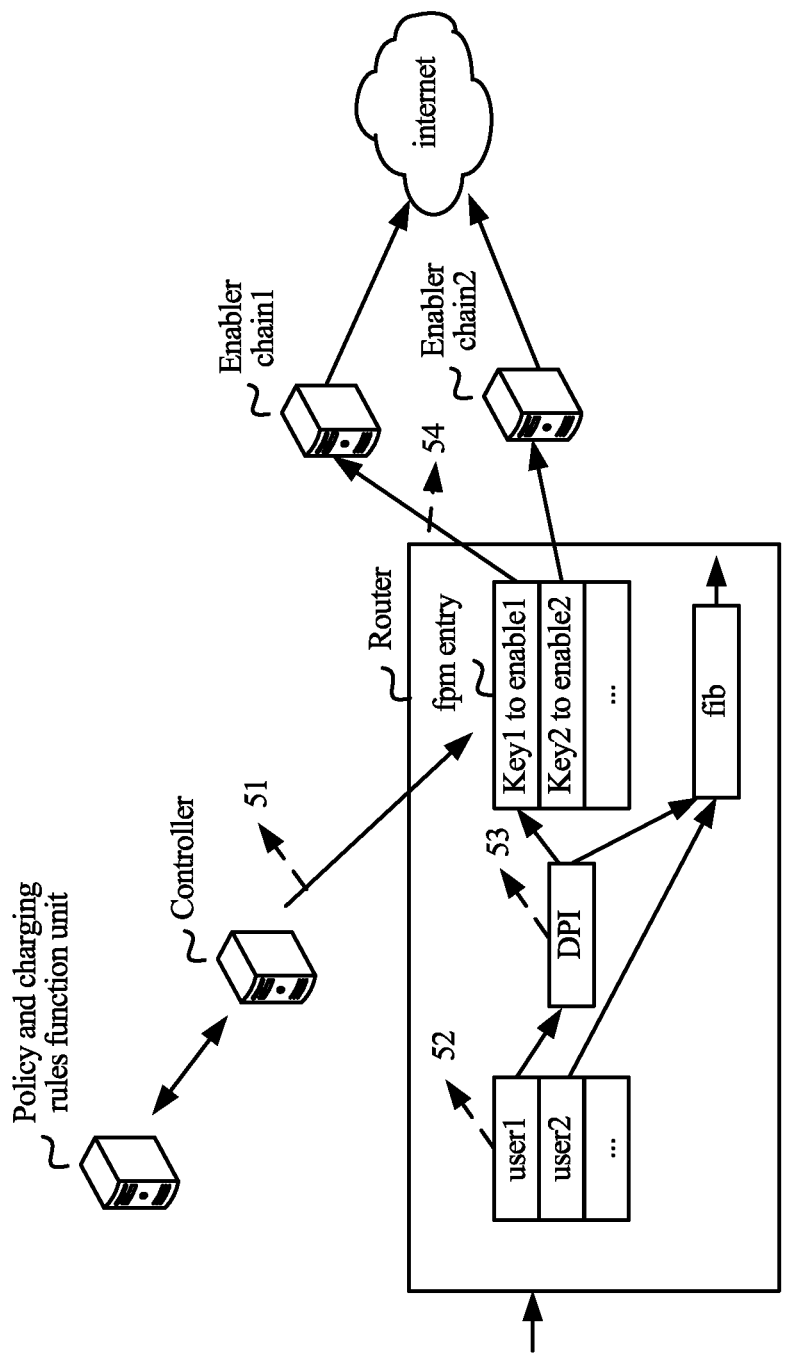
FIG. 5 is a schematic flowchart of specific implementation of Embodiment 2.

The following, with reference to FIG. 5, describes an implementation procedure of separately forwarding different http requests having a same 5-tuple in Embodiment 2, where numerals 51 to 54 in FIG. 5 represent the following serial numbers 51 to 54 in turn. Specifically, the procedure mainly includes the following steps.

51. A router downloads an fpm table from a controller (Controller).

Similar to that in Embodiment 1, the fpm table also includes a correspondence between a feature character (Key) and corresponding routing information.

52. After receiving a request packet, the Router determines, by searching a user table shown in FIG. 5, that is, searching a user policy table, whether a user that sends the request packet has enabled a service of forwarding a packet according to a feature character.

When a determination result is yes, the router further determines indication information that is included in the user policy table and used to indicate how to determine a key word (Key), and then performs 53; when the determination result is no, an FIB may be searched to implement forwarding, according to a packet forwarding manner provided by the prior art, of the request packet.

The user policy table may be but is not limited to being obtained by the router from a PCRF unit.

53. The Router invokes a simple DPI module (which is implemented by hardware) to perform DPI on the request packet; after parsing that the request packet is an http1.1 packet, further invokes the DPI module to determine, according to the indication information that is used to indicate how to determine a key word (Key), a feature character Key in the request packet; then, jumps to perform 54; and if it is parsed that the request packet is not an http1.1 packet, may query the FIB to implement forwarding, according to the packet forwarding manner provided by the prior art, of the request packet.

54. The Router routes the first packet to a corresponding Enabler chain according to an fpm entry hit by the Key.

Embodiment 3

Embodiment 3 is an implementation manner with reference to a "user policy table", a "5-tuple flow table", and an "FPM table".

Figure 6:
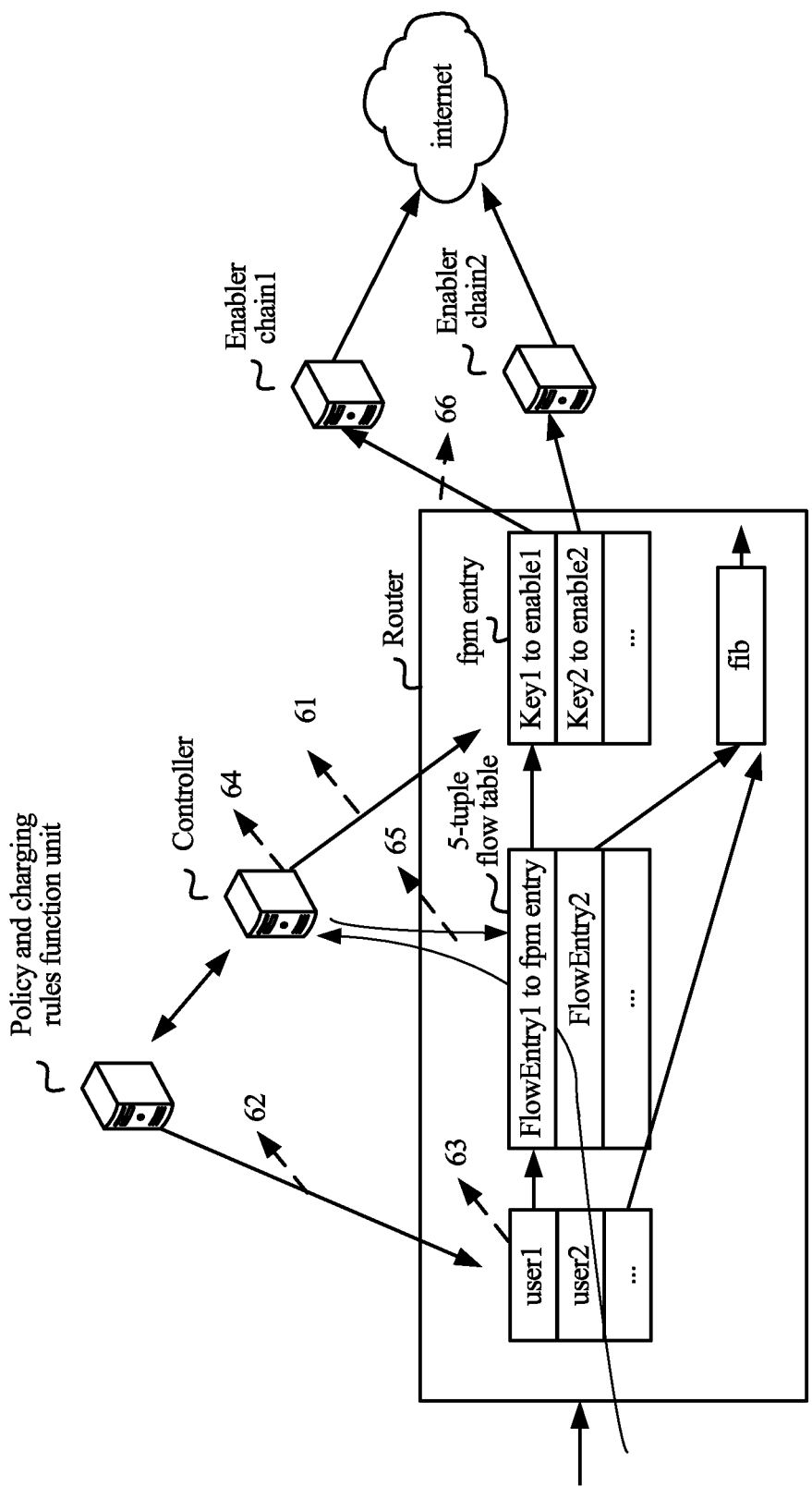
FIG. 6 is a schematic flowchart of specific implementation of Embodiment 3.

The following, with reference to FIG. 6, describes an implementation procedure of separately forwarding different http requests having a same 5-tuple in Embodiment 3, where numerals 61 to 64 in FIG. 6 represent the following serial numbers 61 to 64 in turn. Specifically, the procedure mainly includes the following steps.

61. A router downloads an fpm table from a controller.

Similar to that in Embodiments 1 and 2, the fpm table also includes a correspondence between a feature character (Key) and corresponding routing information.

62. The Router downloads a user policy table, that is, a user table shown in FIG. 6, from a PCRF unit.

63. After receiving a request packet, the Router determines, by searching the user table shown in FIG. 6, that is, searching the user policy table, whether a user that sends the request packet has enabled a service of forwarding a packet according to a feature character.

When a determination result is yes, the router sends the request packet to a controller, and jumps to perform 64; when the determination result is no, an FIB may be queried to implement forwarding, according to a packet forwarding manner provided by the prior art, of the request packet.

64. The Controller performs DPI on the request packet, and when determining, by performing the DPI on the request packet, that the request packet is an http1.1 packet, requests user information from the PCRF unit, so as to determine whether a user that sends the request packet has enabled a service of forwarding a packet according to a feature character.

65. If the Controller determines that the user that sends the request packet has enabled the service of forwarding a packet according to a feature character, the Controller delivers a 5-tuple flow (Five tuple) table to the router.

Information included in the 5-tuple flow table may be used to indicate the following to the router: 1. a manner for obtaining a key word (Key); and 2. a processing manner of an http1.1 request packet including a 5-tuple.

66. The Router determines, according to the 5-tuple flow table delivered by the Controller, that a processing manner of the request packet is "forwarding according to a feature character"; further obtains a Key in the request packet according to information included in the 5-tuple flow table; and routes the first packet to a corresponding Enabler chain according to an fpm entry hit by the Key.

Embodiment 4

Embodiment 4 is an implementation manner of "complex DPI".

The manner in Embodiment 4 is mainly applicable to a scenario in which multiple http requests cannot be differentiated by using a feature character at a fixed field.

Figure 7:
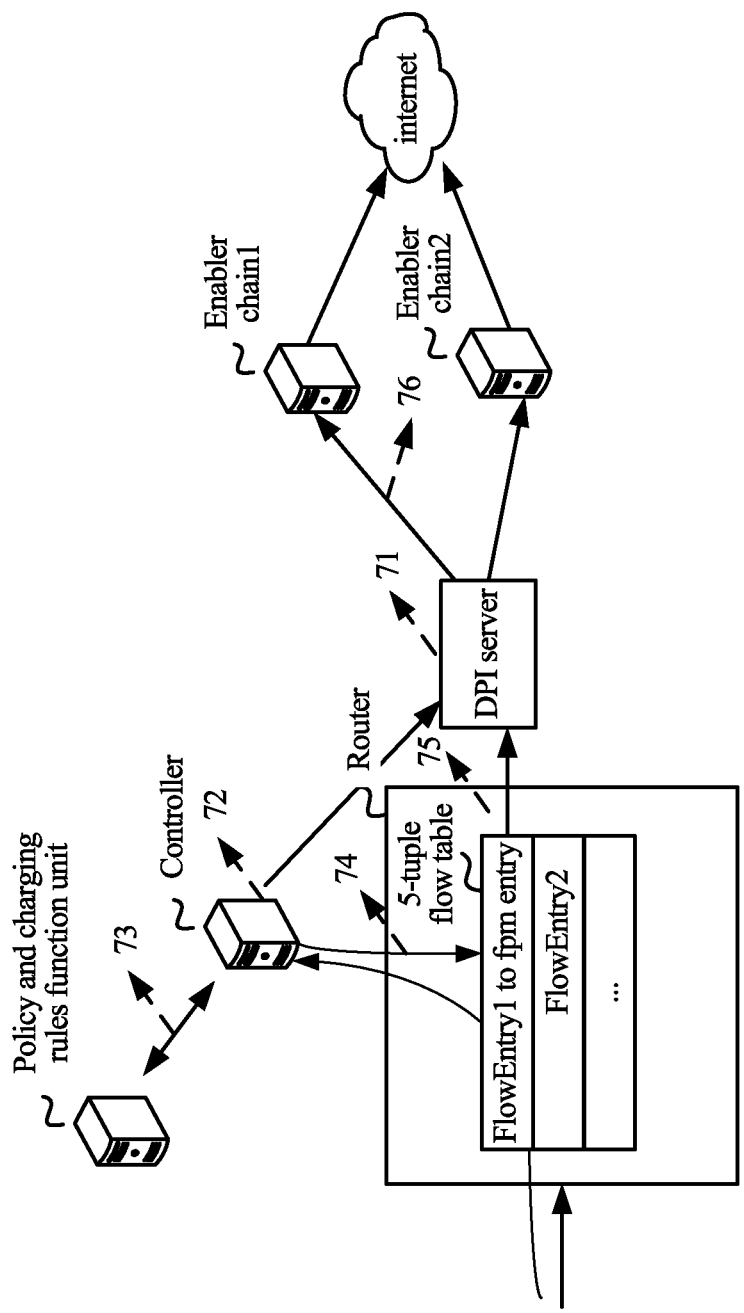
FIG. 7 is a schematic flowchart of specific implementation of Embodiment 4.

The following, with reference to FIG. 7, describes an implementation procedure of separately forwarding different http requests having a same 5-tuple in Embodiment 4, where numerals 71 to 76 in FIG. 7 represent the following serial numbers 71 to 76 in turn. Specifically, the procedure mainly includes the following steps.

71. Preset, on a DPI server, a correspondence between different feature characters and corresponding routing information.

72. After a router mirrors a request packet to a Controller, the Controller performs DPI on the request packet, so as to determine whether the request packet is an http1.1 packet.

73. The Controller requests user information from a PCRF unit if the controller determines that the request packet is an http1.1 packet, so as to determine whether a user that sends the request packet has enabled a service of forwarding a packet according to a feature character.

74. If the Controller determines that the user that sends the request packet has enabled the service of forwarding a packet according to a feature character, the Controller delivers a 5-tuple flow (Five tuple) table to the router.

Information included in the 5-tuple flow table may be used to indicate the following to the router: 1. a manner for determining a key word (Key); and 2. redirecting the request packet to the DPI server.

75. The Router parses, according to the information included in the 5-tuple flow table, the Key from the request packet and sends the Key to the DPI server, and redirects the request packet to the DPI server.

76. The DPI server routes the first packet to a corresponding Enabler chain according to an fpm entry hit by the Key sent from the Router.

Figure 8:
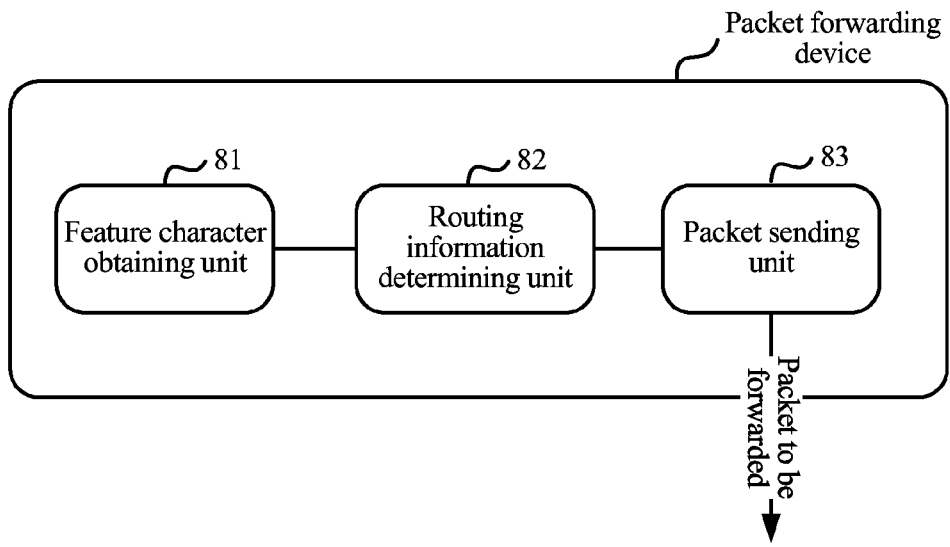
FIG. 8 is a specific schematic structural diagram of a first packet forwarding device according to an embodiment.

Based on the same idea as the first packet forwarding method provided in the embodiment, an embodiment further provides a packet forwarding device, thereby solving a problem that how to implement separate forwarding, according to different paths, of different http requests including a same 5-tuple has not been proposed in the prior art. A specific schematic structural diagram of the packet forwarding device is shown in FIG. 8, which specifically includes a feature character obtaining unit 81, configured to obtain a feature character included in a packet to be forwarded, where the feature character is obtained by parsing, according to a preset packet content parsing policy, other content included in the packet to be forwarded except a 5-tuple. Also included is a routing information determining unit 82, configured to determine, according to a correspondence between different feature characters and corresponding routing information, routing information corresponding to the feature character obtained by the feature character obtaining unit 81. Also included is a packet sending unit 83, configured to send, according to the routing information determined by the routing information determining unit 82, the packet to be forwarded.

Optionally, in an implementation manner corresponding to a function of the feature character obtaining unit 81, the feature character obtaining unit 81 may be specifically divided into the following functional subunits: a packet sending subunit, configured to send, to a controller, the packet to be forwarded; a flow table obtaining subunit, configured to obtain a 5-tuple flow table delivered by the controller after the controller performs deep service identification DPI on the packet to be forwarded that is sent by the packet sending subunit, where the 5-tuple flow table includes at least a correspondence between the 5-tuple included in the packet to be forwarded and a processing manner of the packet to be forwarded; a determining subunit, configured to determine, according to the 5-tuple included in the packet to be forwarded and the 5-tuple flow table obtained by the flow table obtaining subunit, whether the processing manner of the packet to be forwarded is that the packet to be forwarded needs to be forwarded according to the feature character included in the packet to be forwarded; and a feature character obtaining subunit, configured to: when a determination result obtained by the determining subunit is yes, obtain, by performing DPI on the packet to be forwarded, the feature character included in the packet to be forwarded.

Optionally, the packet sending subunit may be specifically configured to: determine whether the packet to be forwarded is a packet of a user-specified protocol; and when determining that the packet to be forwarded is the packet of the user-specified protocol, send, to the controller, the packet to be forwarded.

Alternatively, the packet sending subunit may further be configured to: after determining, according to a user policy table delivered by a policy and charging rules function PCRF unit, that a user that sends the packet to be forwarded has enabled a service of forwarding a packet according to a feature character, send, to the controller, the packet to be forwarded.

The user policy table includes a correspondence between different user identifiers and corresponding subscription states of the service.

Alternatively, after determining that the user that sends the packet to be forwarded has enabled the service of forwarding a packet according to a feature character, the packet sending subunit may further determine whether the packet to be forwarded is a packet of a user-specified protocol; and when determining that the packet to be forwarded is the packet of the user-specified protocol, send, to the controller, the packet to be forwarded.

Optionally, the feature character obtaining unit 81 included in the device provided in the embodiment of the present invention may be specifically configured to: obtain, by performing DPI on the packet to be forwarded, the feature character included in the packet to be forwarded.

For example, the feature character obtaining unit 81 may be specifically configured to: after receiving the packet to be forwarded, determine, according to the 5-tuple included in the packet to be forwarded and a 5-tuple flow table delivered by the controller, whether the feature character included in the packet to be forwarded needs to be determined, where the 5-tuple flow table includes a correspondence between a 5-tuple and a packet processing manner; and when a determination result is yes, obtain, by performing DPI on the packet to be forwarded, the feature character included in the packet to be forwarded.

For another example, the feature character obtaining unit 81 may further be specifically configured to: determine whether the packet to be forwarded is a packet of a user-specified protocol; and when determining that the packet to be forwarded is the packet of the user-specified protocol, obtain, by performing DPI on the packet to be forwarded, the feature character included in the packet to be forwarded.

For a further example, the feature character obtaining unit 81 may be further specifically configured to: after determining, according to a user policy table delivered by a policy and charging rules function PCRF unit, that a user that sends the packet to be forwarded has enabled a service of forwarding a packet according to a feature character, obtain, by performing DPI on the packet to be forwarded, the feature character included in the packet to be forwarded.

The user policy table includes a correspondence between different user identifiers and corresponding subscription states of the service.

Optionally, after determining that the user that sends the packet to be forwarded has enabled the service of forwarding a packet according to a feature character, the feature character obtaining unit 81 may further determine whether the packet to be forwarded is a packet of a user-specified protocol; and when determining that the packet to be forwarded is the packet of the user-specified protocol, obtain, by performing DPI on the packet to be forwarded, the feature character included in the packet to be forwarded.

Optionally, the routing information determining unit 82 included in the device provided in the embodiment may be specifically configured to: determine, according to the correspondence in a flexible packet matching FPM table that is downloaded in advance, the routing information corresponding to the obtained feature character.

Optionally, the feature character included in the packet to be forwarded may specifically include a feature character located at a specific position of the packet to be forwarded.

Figure 9:
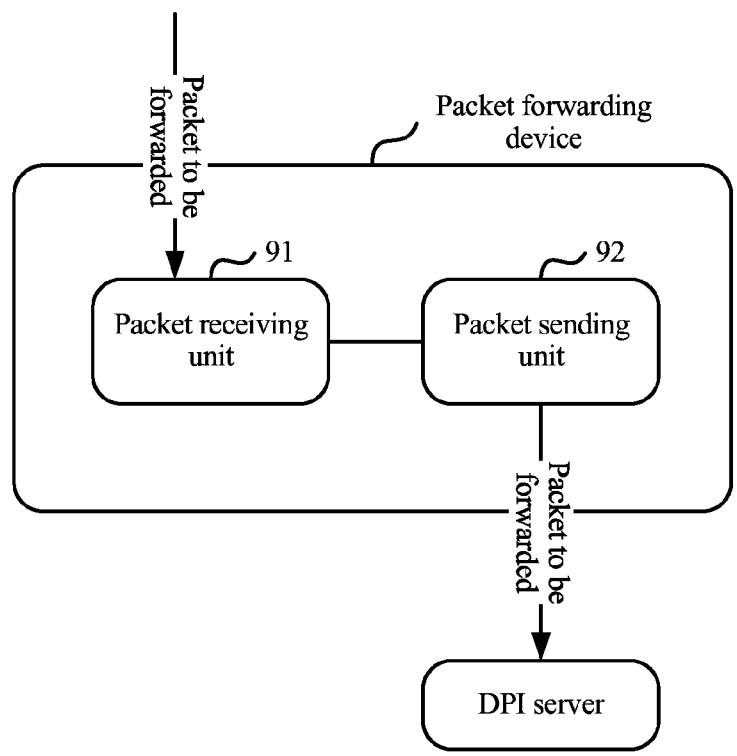
FIG. 9 is a specific schematic structural diagram of a second packet forwarding device according to an embodiment.

Based on the same idea as the second packet forwarding method provided in the embodiment, an embodiment further provides a packet forwarding device. A specific schematic structural diagram of the packet forwarding device is shown in FIG. 9, which specifically includes a packet receiving unit 91, configured to receive a packet to be forwarded; and a packet sending unit 92, configured to send the packet to be forwarded that is received by the packet receiving unit 91 to a DPI server, so as to instruct the DPI server to perform: determining, according to a correspondence between different feature characters and corresponding routing information, routing information corresponding to a feature character included in the packet to be forwarded, and sending, according to the determined routing information, the packet to be forwarded.

The feature character included in the packet to be forwarded is obtained by parsing, according to a preset packet content parsing policy, other content included in the packet to be forwarded except a 5-tuple.

Optionally, in an implementation manner corresponding to a function of the packet sending unit 92, the unit may be specifically divided into the following functional subunits: a packet sending subunit, configured to send, to a controller, the packet to be forwarded; a flow table obtaining subunit, configured to obtain a 5-tuple flow table delivered by the controller after the controller performs deep service identification DPI on the packet to be forwarded that is sent by the packet sending subunit, where the 5-tuple flow table includes at least a correspondence between the 5-tuple included in the packet to be forwarded and a processing manner of the packet to be forwarded; a determining subunit, configured to determine, according to the 5-tuple included in the packet to be forwarded and the 5-tuple flow table obtained by the flow table obtaining subunit, whether the processing manner of the packet to be forwarded is that the packet to be forwarded needs to be forwarded according to the feature character included in the packet to be forwarded; and the packet sending subunit, configured to: when a determination result obtained by the determining subunit is yes, send, to the DPI server, the packet to be forwarded.

Based on the same invention as the third packet forwarding method provided in the embodiment, an embodiment further provides an information sending device. A specific schematic structural diagram of the information sending device is shown in FIG. 10, which specifically includes a correspondence obtaining unit 101, configured to obtain a correspondence between different feature characters and corresponding routing information; and a correspondence sending unit 102, configured to send, to the packet forwarding device, information that is used to represent the correspondence obtained by the correspondence obtaining unit 101, so as to instruct the packet forwarding device to perform: determining, according to the correspondence, routing information corresponding to a feature character included in a packet to be forwarded, and sending, according to the determined routing information, the packet to be forwarded.

The feature character is obtained by parsing, according to a preset packet content parsing policy, other content included in the packet to be forwarded except a 5-tuple.

Figure 10:
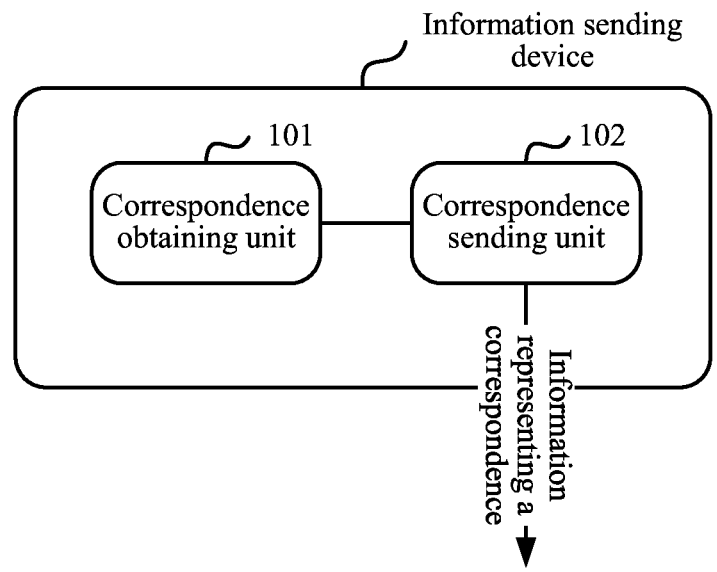
FIG. 10 is a specific schematic structural diagram of an information sending device according to an embodiment.

Optionally, the device shown in FIG. 10 may further include the following functional units: a packet obtaining unit, configured to: before the correspondence obtaining unit 101 obtains the correspondence, or before the correspondence sending unit 102 sends, to the packet forwarding device, the information that is used to represent the correspondence, obtain the packet to be forwarded that is sent by the packet forwarding device. Also included is a determining unit, configured to: after obtaining the feature character by performing DPI on the packet to be forwarded that is obtained by the packet obtaining unit, determine whether the feature character belongs to a preset feature character set, where a feature character included in the feature character set is a feature character included in a packet to be forwarded according to the correspondence. Also included is a flow table sending unit, configured to send the 5-tuple flow table to the packet forwarding device according to a determination result obtained by the determining unit and the 5-tuple included in the packet to be forwarded, where the 5-tuple flow table includes at least a correspondence between a 5-tuple and a processing manner of a packet to be forwarded; and when the determination result is yes, the processing manner of the packet to be forwarded is that the packet to be forwarded needs to be forwarded according to the feature character included in the packet to be forwarded; and when the determination result is no, the processing manner of the packet to be forwarded is that the packet to be forwarded does not need to be forwarded according to the feature character included in the packet to be forwarded.

Optionally, the flow table sending unit may be specifically configured to: determine, according to user information that is stored by a policy and charging rules function PCRF unit and used to represent whether a user has enabled a service of forwarding a packet according to a feature character, whether a user that sends the packet to be forwarded has enabled the service; and when determining that the user has enabled the service, send the 5-tuple flow table to the packet forwarding device according to the determination result and the 5-tuple included in the packet to be forwarded.

Optionally, the flow table sending unit is specifically configured to: first determine whether the packet to be forwarded is a packet of a user-specified protocol; and when determining that the packet to be forwarded is the packet of the user-specified protocol, determine, according to the user information, whether the user that sends the packet to be forwarded has enabled the service.

Figure 11:
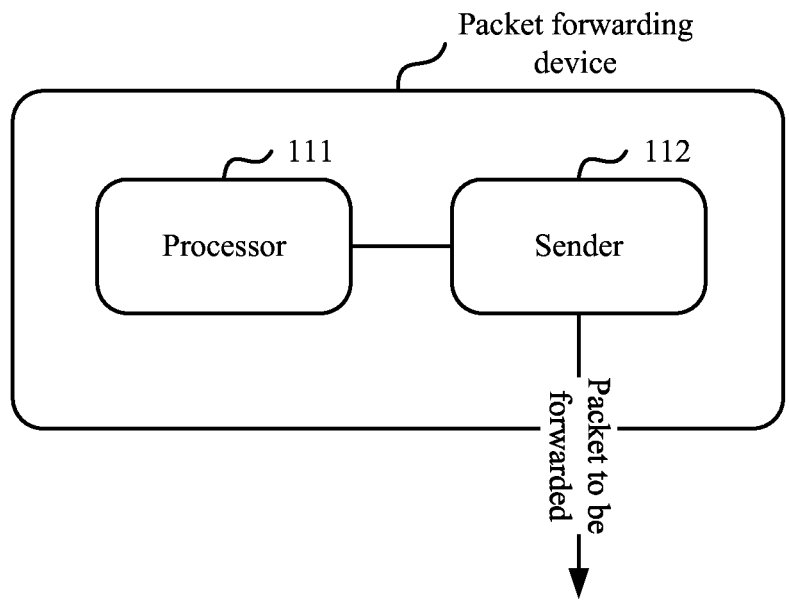
FIG. 11 is a specific schematic structural diagram of a third packet forwarding device according to an embodiment.

Based on the same idea as the first packet forwarding method provided in the embodiment, an embodiment further provides a packet forwarding device, thereby solving a problem that how to implement separate forwarding, according to different paths, of different http requests including a same 5-tuple has not been proposed in the prior art. A specific schematic structural diagram of the packet forwarding device is shown in FIG. 11, which specifically includes: a processor 111, configured to obtain a feature character included in a packet to be forwarded, where the feature character is obtained by parsing, according to a preset packet content parsing policy, other content included in the packet to be forwarded except a 5-tuple; and determine, according to a correspondence between different feature characters and corresponding routing information, routing information corresponding to the obtained feature character. Also included is a sender 112, configured to send, according to the routing information determined by the processor 111, the packet to be forwarded.

Optionally, the processor 111 may be specifically configured to: control the sender 112 to send, to a controller, the packet to be forwarded; obtain a 5-tuple flow table delivered by the controller after the controller performs DPI on the packet to be forwarded, where the 5-tuple flow table includes at least a correspondence between the 5-tuple included in the packet to be forwarded and a processing manner of the packet to be forwarded; determine, according to the 5-tuple included in the packet to be forwarded and the obtained 5-tuple flow table, whether the processing manner of the packet to be forwarded is that the packet to be forwarded needs to be forwarded according to the feature character included in the packet to be forwarded; and when a determination result is yes, obtain, by performing DPI on the packet to be forwarded, the feature character included in the packet to be forwarded.

Optionally, the processor 111 may be specifically configured to: determine whether the packet to be forwarded is a packet of a user-specified protocol; and when determining that the packet to be forwarded is the packet of the user-specified protocol, control the sender 112 to send, to the controller, the packet to be forwarded.

Alternatively, the processor 111 may be specifically configured to: after determining, according to a user policy table delivered by a policy and charging rules function PCRF unit, that a user that sends the packet to be forwarded has enabled a service of forwarding a packet according to a feature character, control the sender 112 to send, to the controller, the packet to be forwarded.

The user policy table includes a correspondence between different user identifiers and corresponding subscription states of the service.

Optionally, after determining that the user that sends the packet to be forwarded has enabled the service of forwarding a packet according to a feature character, the processor 111 may further determine whether the packet to be forwarded is a packet of a user-specified protocol; and when determining that the packet to be forwarded is the packet of the user-specified protocol, control the sender 112 to send, to the controller, the packet to be forwarded.

Optionally, the processor 111 may be specifically configured to: obtain, by performing DPI on the packet to be forwarded, the feature character included in the packet to be forwarded.

For example, the processor 111 may be specifically configured to: after receiving the packet to be forwarded, determine, according to the 5-tuple included in the packet to be forwarded and a 5-tuple flow table delivered by the controller, whether the feature character included in the packet to be forwarded needs to be determined, where the 5-tuple flow table includes a correspondence between a 5-tuple and a packet processing manner; and when a determination result is yes, obtain, by performing DPI on the packet to be forwarded, the feature character included in the packet to be forwarded.

For another example, the processor 111 may be specifically configured to: determine whether the packet to be forwarded is a packet of a user-specified protocol; and when determining that the packet to be forwarded is the packet of the user-specified protocol, obtain, by performing DPI on the packet to be forwarded, the feature character included in the packet to be forwarded.

For a further example, the processor 111 may be further specifically configured to: after determining, according to a user policy table delivered by a policy and charging rules function PCRF unit, that a user that sends the packet to be forwarded has enabled a service of forwarding a packet according to a feature character, obtain, by performing DPI on the packet to be forwarded, the feature character included in the packet to be forwarded.

The user policy table includes a correspondence between different user identifiers and corresponding subscription states of the service.

Optionally, after determining that the user that sends the packet to be forwarded has enabled the service of forwarding a packet according to a feature character, the processor 111 may further determine whether the packet to be forwarded is a packet of a user-specified protocol; and when determining that the packet to be forwarded is the packet of the user-specified protocol, obtain, by performing DPI on the packet to be forwarded, the feature character included in the packet to be forwarded.

Optionally, the processor 111 may be specifically configured to: determine, according to the correspondence in a flexible packet matching FPM table that is downloaded in advance, the routing information corresponding to the obtained feature character.

Optionally, the feature character included in the packet to be forwarded may specifically include a feature character located at a specific position of the packet to be forwarded.

Figure 12:
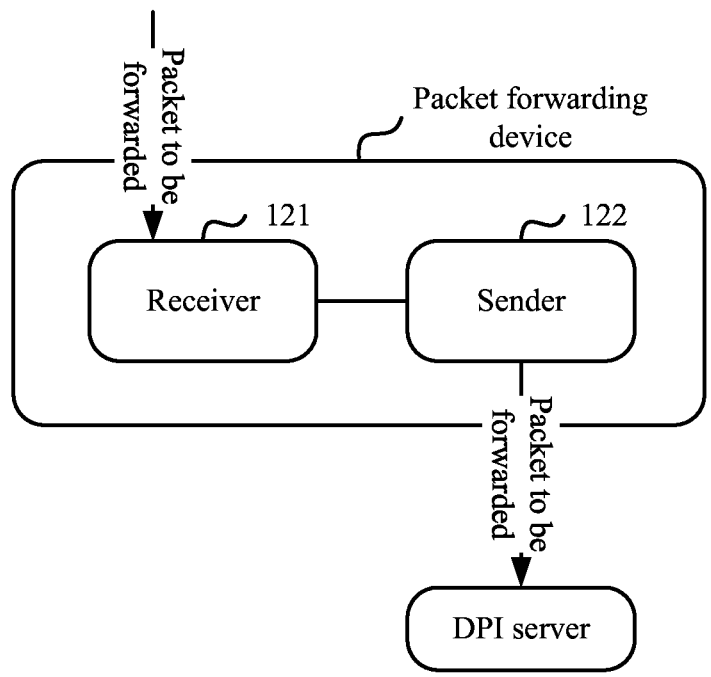
FIG. 12 is a specific schematic structural diagram of a fourth packet forwarding device according to an embodiment.

Based on the same idea as the second packet forwarding method provided in the embodiment, an embodiment further provides a packet forwarding device. A specific schematic structural diagram of the packet forwarding device is shown in FIG. 12. The device includes a receiver 121, configured to receive a packet to be forwarded; and a sender 122, configured to send the packet to be forwarded that is received by the receiver 121 to a DPI server, so as to instruct the DPI server to perform: determining, according to a correspondence between different feature characters and corresponding routing information, routing information corresponding to a feature character included in the packet to be forwarded, and sending, according to the determined routing information, the packet to be forwarded.

The feature character included in the packet to be forwarded is obtained by parsing, according to a preset packet content parsing policy, other content included in the packet to be forwarded except a 5-tuple.

Optionally, the sender 122 may be further configured to send, to a controller, the packet to be forwarded; and the receiver 121 is further configured to obtain a 5-tuple flow table delivered by the controller after the controller performs deep service identification DPI on the packet to be forwarded that is sent by the sender 122, where the 5-tuple flow table includes at least a correspondence between the 5-tuple included in the packet to be forwarded and a processing manner of the packet to be forwarded. Accordingly, the device may further include a processor, configured to determine, according to the 5-tuple included in the packet to be forwarded and the obtained 5-tuple flow table, whether the processing manner of the packet to be forwarded is that the packet to be forwarded needs to be forwarded according to the feature character included in the packet to be forwarded. Accordingly, the sender 122 is specifically configured to send, to the DPI server when a determination result obtained by the processor is yes, the packet to be forwarded.

Figure 13:
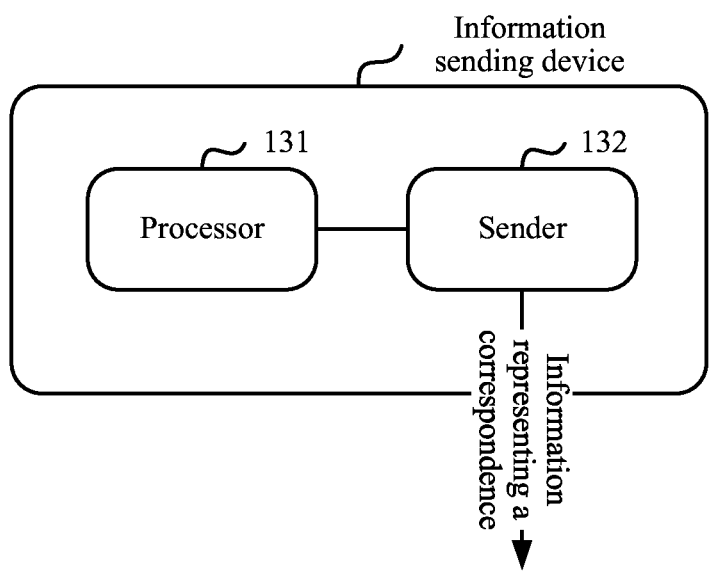
FIG. 13 is a specific schematic structural diagram of an information sending device according to an embodiment.

Based on the same idea as the third packet forwarding method provided in the embodiment, an embodiment further provides an information sending device. A specific structure of the information sending device is shown in FIG. 13. The device includes a processor 131, configured to obtain a correspondence between different feature characters and corresponding routing information; and a sender 132, configured to send, to a packet forwarding device, information that is used to represent the correspondence obtained by the processor 131, so as to instruct the packet forwarding device to perform: determining, according to the correspondence, routing information corresponding to a feature character included in a packet to be forwarded, and sending, according to the determined routing information, the packet to be forwarded.

The feature character is obtained by parsing, according to a preset packet content parsing policy, other content included in the packet to be forwarded except a 5-tuple.

Optionally, the processor 131 is further configured to, before obtaining the correspondence, or before the sender 132 sends, to the packet forwarding device, the information that is used to represent the correspondence, obtain the packet to be forwarded that is sent by the packet forwarding device, and after obtaining the feature character by performing DPI on the obtained packet to be forwarded, determine whether the feature character belongs to a preset feature character set, where a feature character included in the feature character set is a feature character included in a packet to be forwarded according to the correspondence. Accordingly, the sender 132 is further configured to send the 5-tuple flow table to the packet forwarding device according to a determination result obtained by the processor 131 and the 5-tuple included in the packet to be forwarded, where the 5-tuple flow table includes at least a correspondence between a 5-tuple and a processing manner of a packet to be forwarded; and when the determination result is yes, the processing manner of the packet to be forwarded is that the packet to be forwarded needs to be forwarded according to the feature character included in the packet to be forwarded; and when the determination result is no, the processing manner of the packet to be forwarded is that the packet to be forwarded does not need to be forwarded according to the feature character included in the packet to be forwarded.

Optionally, the processor 131 is specifically configured to: determine, according to user information that is stored by a policy and charging rules function PCRF unit and used to represent whether a user has enabled a service of forwarding a packet according to a feature character, whether a user that sends the packet to be forwarded has enabled the service. Accordingly, the sender 132 is specifically configured to, when the processor 131 determines that the user has enabled the service, send the 5-tuple flow table to the packet forwarding device according to the determination result and the 5-tuple included in the packet to be forwarded.

Optionally, the processor 131 is specifically configured to: determine whether the packet to be forwarded is a packet of a user-specified protocol; and when determining that the packet to be forwarded is the packet of the user-specified protocol, determine, according to the user information, whether the user that sends the packet to be forwarded has enabled the service.

It is understandable by persons skilled in the art that embodiments may be provided as methods, systems, or computer programs. Therefore, embodiments may adopt forms of complete hardware embodiments, complete software embodiments, or embodiments combining software and hardware. Furthermore, embodiments may adopt forms of computer program products implemented in one or multiple computer available storage media (including but not limited to disk memories, CD-ROMs, optical memories) including computer available program code.

The present invention is described according to flowcharts and/or block diagrams of methods, devices (systems), and computer program products provided in embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device so that a series of operations and steps are executed on the computer or the other programmable device so as to generate computer-implemented processing. Thereby, the instructions executed on the computer or the other programmable device provide steps for implementing a specific function in one or more processes in the flowcharts and/or in one or more blocks in the block diagrams.

Although some preferred embodiments of the present application have been described, a person skilled in the art can make changes and modifications to these embodiments once learning the basic inventive concept. Therefore, the following claims are intended to be explained as to cover the preferred embodiments and all changes and modifications falling within the scope of the present application.

It is apparent that a person skilled in the art can make various modifications and variations to the present invention without departing from the spirit and scope of the present invention. The present invention is intended to cover these modifications and variations provided that they fall in the scope of protection defined by the following claims or their equivalents.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A packet forwarding method, comprising:
   sending, by a packet forwarding device, a packet comprising a 5-tuple to a controller;
   obtaining, by the packet forwarding device, a first correspondence from the controller, wherein the first correspondence comprises the 5-tuple in the packet and a processing manner of the packet, wherein the processing manner indicates that the packet needs to be forwarded based on a feature character in the packet;
   determining, by the packet forwarding device, the processing manner of the packet based on the 5-tuple in the packet and the first correspondence;
   in response to determining the processing manner of the packet, determining, by the packet forwarding device, the feature character by performing deep packet inspection (DPI) on the packet;
   determining, by the packet forwarding device, routing information for the packet based on the determined feature character and a second correspondence, wherein the second correspondence comprises the feature character and the routing information; and
   sending, by the packet forwarding device, the packet based on the determined routing information.

2. The method according to claim 1, wherein sending, by the packet forwarding device, the packet comprising the 5-tuple to a controller comprises:
   determining, by the packet forwarding device, that the packet is of a user-specified protocol; and
   in response to determining that the packet is of the user-specified protocol, sending the packet to the controller.

3. The method according to claim 1, wherein determining routing information based on the determined feature character and the second correspondence comprises:
   determining, by the packet forwarding device, the routing information based on the second correspondence and the feature character, wherein the second correspondence is comprised in a flexible packet matching (FPM) table, and the FPM table is downloaded before the packet forwarding device determines the routing information.

4. The method according to claim 1, wherein sending, by the packet forwarding device, the packet comprising the 5-tuple to a controller comprises:
   based on a third correspondence, determining, by the packet forwarding device, that the user sending the packet has enabled a service of forwarding a packet based on a feature character, wherein the third correspondence comprises the information of the user and a subscription state of the service; and
   sending the packet to the controller in response to determining that the user has enabled the service.

5. The method according to claim 4, wherein sending the packet to the controller in response to determining that the user has enabled the service comprises:
   after determining that the user sending the packet has enabled the service, determining, by the packet forwarding device, that the packet is of a user-specified protocol; and
   in response to determining that the packet is of the user-specified protocol, sending the packet to the controller.

6. A packet forwarding device, comprising:
   a processor, configured to:
   control a transmitter to send a packet comprising a 5-tuple to a controller;
   obtain a first correspondence from the controller, wherein the first correspondence comprises the 5-tuple in the packet and a processing manner of the packet, wherein the processing manner indicates that the packet needs to be forwarded based on a feature character in the packet;
determine the processing manner of the packet based on the 5-tuple in the packet and the first correspondence;
in response to determining the processing manner of the packet, determine the feature character in the packet by performing deep packet inspection (DPI) on the packet;
determine routing information for the packet based on the determined feature character and a second correspondence, wherein the second correspondence comprises the feature character and the routing information; and
the transmitter, configured to send the packet based on the routing information determined by the processor.

7. The device according to claim 6, wherein the processor is configured to:
determine the packet is of a user-specified protocol; and
in response to determining that the packet is of the user-specified protocol, control the transmitter to send the packet to the controller.

8. The device according to claim 6, wherein the processor is configured to:
based on a third correspondence, determine that a user sending the packet has enabled a service of forwarding a packet based on a feature character; and
control the transmitter to send the packet to the controller in response to determining that the user has enabled the service.

9. The device according to claim 8, wherein the processor is configured to:
after determining that the user sending the packet has enabled the service, determine that the packet is of a user-specified protocol; and
in response to determining that the packet is of the user-specified protocol, control the transmitter send the packet to the controller.

10. The device according to claim 6, wherein the processor is further configured to:
determine, based on the first correspondence and the feature character, the routing information, wherein the first correspondence is comprised in a flexible packet matching (FPM) table, and the FPM table is downloaded before the routing information is determined.

11. A packet forwarding device, comprising:
a transceiver, configured to receive a packet, the packet comprising a 5-tuple; and
a processor;
wherein the processor is configured to:
determine a processing manner of the received packet based on the 5-tuple and a first correspondence, the first correspondence being received from a controller, wherein the first correspondence comprises the 5-tuple and the processing manner of the packet, and wherein the processing manner indicates that the packet needs to be forwarded based on a feature character in the packet;
in response to determining the processing manner of the packet, determine the feature character in the packet by performing deep packet inspection (DPI) on the packet;
determine routing information for the packet based on the determined feature character and a second correspondence, wherein the second correspondence comprises the feature character and the routing information; and
wherein the transceiver is further configured to:
send the packet based on the routing information determined by the processor.

12. A packet forwarding device, comprising:
a processor, configured to:
determine that a packet is of a user-specified protocol; and
in response to determining that the packet is of the user-specified protocol, determine a feature character in the packet by performing deep packet inspection (DPI) on the packet;
determine routing information for the packet based on the determined feature character and a first correspondence, wherein the first correspondence comprises the feature character and the routing information; and
a transmitter, configured to send the packet based on the routing information determined by the processor.

13. A packet forwarding device, comprising:
a processor, configured to:
determine, based on a user policy table, that a user sending a packet has enabled a service of forwarding a packet according to a feature character;
in response to determining that the user has enabled the service, determine the feature character in the packet by performing deep packet inspection (DPI) on the packet
determine routing information for the packet based on the determined feature character and a first correspondence, wherein the first correspondence comprises the feature character and the routing information; and
a transmitter, configured to send the packet based on the routing information determined by the processor.

14. The device according to claim 13, wherein the processor is further configured to:
after determining that the user has enabled the service of forwarding a packet based on a feature character, determine that the packet is of a user-specified protocol; and
in response to determining that the packet is of the user-specified protocol, determine the feature character in the packet by performing DPI on the packet.

15. A information sending device, comprising a transceiver and a processor;
wherein the processor is configured to:
determine a feature character in a packet by performing deep packet inspection (DPI) on the packet, wherein the packet is received by the transceiver, and the packet comprises a 5-tuple;
in response to determining the feature character in the packet, determine that the feature character belongs to a preset feature character set; and
in response to determining that the feature character belongs to the preset feature character set, generate a first correspondence, wherein the first correspondence comprises the 5-tuple and a processing manner of the packet, and wherein the processing manner indicates that the packet needs to be forwarded based on the feature character in the packet, and
wherein the transceiver is configured to:
receive the packet from a packet forwarding device, and send the first correspondence to the packet forwarding device.

16. The device according to claim 15, wherein the processor is further configured to determine, based on a second correspondence, that a user sending the packet has enabled a service of forwarding a packet according to a feature character; and in response to determining that the user has enabled the service, the transceiver is configured to send the first correspondence to the packet forwarding device.

17. The device according to claim 15, wherein the processor is configured to:

determine that the packet is of a user-specified protocol; and in response to determining that the packet is of the user-specified protocol, determine that the user has enabled the service based on the information of a user and a second correspondence.

18. The device according to claim 15, wherein the processor is further configured to obtain a third correspondence, wherein the third correspondence comprises the feature character and routing information; and the transceiver is further configured to send the third correspondence obtained by the processor to the packet forwarding device.

* * * * *